United States Patent [19]

Martin

[11] Patent Number: 5,264,063
[45] Date of Patent: Nov. 23, 1993

[54] METHOD FOR MAKING FLEXIBLE RETROREFLECTIVE SHEET MATERIAL

[75] Inventor: David C. Martin, Berlin, Conn.

[73] Assignee: Reflexite Corporation, New Britain, Conn.

[21] Appl. No.: 525,244

[22] Filed: May 16, 1990

[51] Int. Cl.⁵ .............................................. G02B 5/00
[52] U.S. Cl. .................... 156/247; 359/530; 359/532; 264/1.9
[58] Field of Search ............... 156/247; 350/105, 103; 427/164; 359/518, 519, 530, 532; 264/1.9

[56] References Cited

U.S. PATENT DOCUMENTS

| | | | |
|---|---|---|---|
| Re. 30,892 | 3/1982 | Bingham et al. | 428/241 |
| 1,805,224 | 5/1931 | Oestnaes | 350/103 |
| 2,167,149 | 7/1939 | Grote | 350/103 |
| 2,481,757 | 9/1949 | Jungersen | 350/103 |
| 3,253,146 | 5/1966 | de Vries | 350/103 |
| 3,374,044 | 3/1968 | Benson | 350/103 |
| 3,388,027 | 6/1968 | Altman | 350/103 |
| 3,420,597 | 1/1969 | Nellessen et al. | 350/103 |
| 3,493,286 | 2/1970 | Bacon | 350/103 |
| 3,496,006 | 2/1970 | Rideout et al. | 350/103 |
| 3,567,307 | 3/1971 | Rideout et al. | 350/103 |
| 3,607,344 | 9/1971 | Baumann et al. | 350/105 |
| 3,614,199 | 10/1971 | Altman | 350/105 |
| 3,689,346 | 9/1972 | Rowland | 350/103 |
| 3,700,305 | 10/1972 | Bingham | 428/241 |
| 3,802,944 | 4/1974 | Tung | 161/3.5 |
| 3,811,983 | 5/1974 | Rowland | 350/103 |
| 3,830,682 | 8/1974 | Rowland | 350/103 |
| 3,924,929 | 12/1975 | Holmen et al. | 350/103 |
| 3,975,083 | 8/1976 | Rowland | 350/105 |
| 4,025,159 | 5/1977 | McGrath | 350/105 |
| 4,082,426 | 4/1978 | Brown | 350/105 |
| 4,099,838 | 7/1978 | Cook et al. | 350/105 |
| 4,145,112 | 3/1979 | Crone et al. | 350/103 |
| 4,153,412 | 5/1979 | Bailey | 350/105 |
| 4,555,161 | 11/1985 | Rowland | 350/103 |
| 4,618,518 | 10/1986 | Pricone et al. | 350/105 |
| 4,637,950 | 1/1987 | Bergeson et al. | 428/325 |
| 4,763,985 | 8/1988 | Bingham | 350/103 |
| 4,801,193 | 1/1989 | Martin | 350/103 |

Primary Examiner—David A. Simmons
Assistant Examiner—J. Sells

[57] ABSTRACT

A flexible retroreflective sheet material is formed by adhering a first face of a first flexible synthetic resin sheet material to a synthetic resin second sheet material by a first adhesive which preferentially adheres to the second sheet material. On the second face of said first sheet material are thereafter formed closely spaced retroreflective microprisms having a height of 0.001–0.010 inches. A second adhesive is applied to the second face of said first sheet and firmly engages therewith. A flexible backing material is adhered to the second adhesive over the second face. Lastly, the second sheet material and first adhesive are stripped from the first sheet material to produce a firmly bonded flexible composite sheet material comprised of the adhesively bonded first sheet material and backing material. The retroreflective microprisms may be coated with a reflective metal deposit or surrounded by air to provide a retroreflective interface.

10 Claims, 3 Drawing Sheets

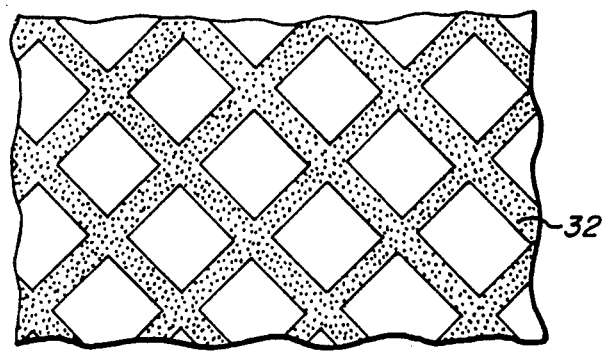
FIG. 9
FIG. 10
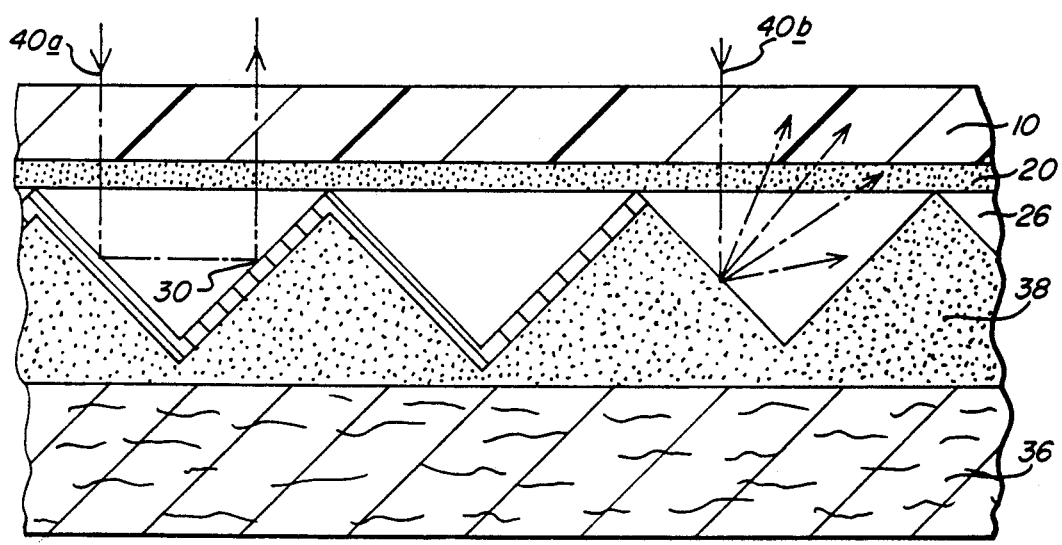
FIG. 11
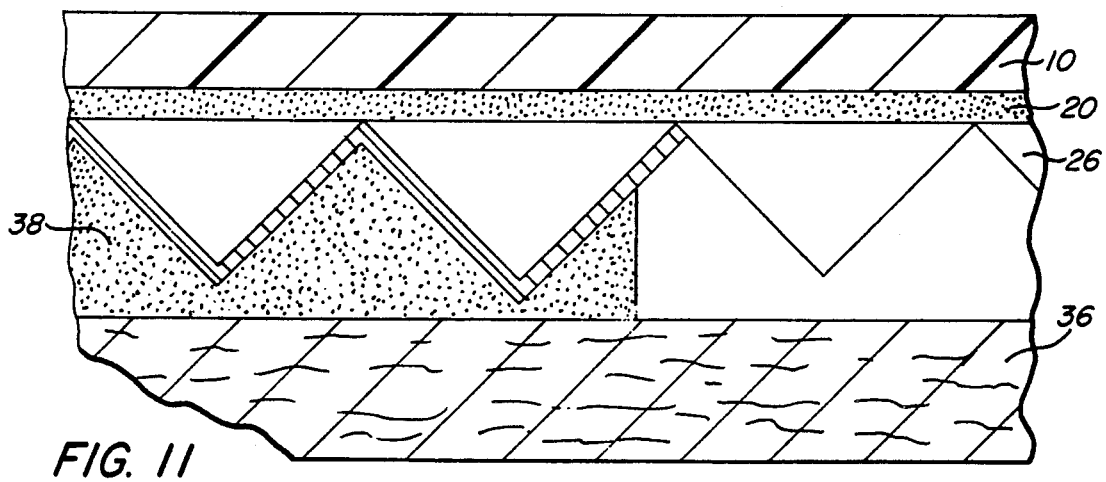

METHOD FOR MAKING FLEXIBLE RETROREFLECTIVE SHEET MATERIAL

BACKGROUND OF THE INVENTION

The present invention relates to retroreflective sheeting employing microprism formations to retroreflect the light rays impinging thereon, and, more particularly, to a method for producing flexible retroreflective sheet material which may be readily attached to support structures.

Retroreflective sheet material is widely employed for a variety of safety and decorative purposes, and is particularly useful when the need for night time visibility is significant under conditions of low ambient light In retroreflective materials, the light rays impinging upon the front surface are reflected back towards the source of the illumination in a substantially parallel path. In situations where headlights or search lights on boats and aircraft are the only source of illumination, this ability to retroreflect the bulk of the rays falling thereon is especially significant for warning signs, delineators and the like.

Minnesota Mining and Manufacturing Corporation has manufactured retroreflective sheeting utilizing minute glass beads embedded in a matrix of synthetic resin to provide such retroreflection, and these materials have been sold under the trademark SCOTCHLITE. Illustrative of such materials is Bergeson et al U.S. Pat. No. 4,637,950 granted Jan. 20, 1987.

Applicant's assignee, Reflexite Corporation, has been marketing under the trademark REFLEXITE, reflective sheeting employing microprisms formations to produce such retroreflection. Illustrative of such materials is Rowland U.S. Pat. No. 3,689,346 granted Sep. 5, 1972.

Among the applications for such retroreflective materials are reflective tapes and patches for clothing of firemen, reflective vests and belts, bands for posts and barrels, traffic cone collars, highway signs, warning reflectors, and the like.

Unfortunately, many of the resins which exhibit long life when exposed to ultraviolet radiation and wide temperature fluctuations also tend to be relatively stiff. As a result, the retroreflective materials made therefrom are difficult to form or have a tendency to crack or craze when repeatedly flexed. Moreover, it is desirable to import fire retardant or resistant properties to the material so that it will function even when exposed to relatively high temperatures.

It is an object of the present invention to provide a novel method for making retroreflective sheeting using microprism formations which is relatively flexible and long lived.

It is also an object of the present invention to provide such a method which produces a retroreflective sheet material which may be readily fabricated and which is durable and readily sewn or otherwise secured to support structures.

Another object of the present invention is to provide such methods for fabricating such retroreflective sheet material which are relatively simple and relatively economical, and which produce long-lived materials.

SUMMARY OF THE INVENTION

It has now been found that the foregoing and related objects may be readily attained in a method for making a flexible retroreflective sheet material in which a first face of a first relatively flexible synthetic resin sheet material is adhered to a synthetic resin second sheet material by a first adhesive which preferentially adheres to the second sheet material. The first sheet material has a thickness of 0.0001–0.0007 inch and the second sheet material has a thickness of 0.002–0.015 inch. On the second face of the first sheet material are formed closely spaced retroreflective microprisms having a height of 0.001–0.010 inch.

There is then applied to the second face of the first sheet material a second adhesive which firmly engages therewith, and a flexible backing material is adhered to the second adhesive over the second face. The second sheet material and first adhesive are stripped from the first sheet material to produce a firmly bonded flexible composite sheet material comprised of the adhesively bonded first sheet material and backing material.

In one embodiment, a metallic deposit is produced on the surfaces of the microprisms before application of the second adhesive thereto. In a variation of this embodiment, a portion of the metallic deposit is removed to provide a pattern of microprisms which are free from the metallic deposit, and the second adhesive is disposed over the microprisms which have the metallic deposit. This second adhesive spaces the backing member from the microprisms to provide an air interface thereabout. In one variant, the second adhesive is applied to the metallic deposit in a pattern and the metallic deposit not protected thereby is stripped. The second adhesive is preferably applied in a grid pattern.

In another variant, a portion of the metallic deposit is removed to provide a pattern of microprisms which are free from the metallic deposit, and thereafter there is applied to the entire second face a coating of a non-reflective colored second adhesive. Conveniently, the removing step for the metallic deposit comprises first applying a protective material to the metallic deposit in a pattern and then removing the metallic deposit in the areas unprotected by the protective material.

In the preferred embodiment, the backing material is a fabric, although flexible synthetic resin sheet material may also be employed.

The step of forming the microprisms first involves forming a tie coat of synthetic resin on the second face and thereafter forming the microprisms on the tie coat.

The resultant flexible synthetic resin sheet material comprises a body member of transparent synthetic resin sheet material having a planar first face and a second face with closely spaced synthetic resin retroreflective microprisms thereover. The body member has a thickness from the first face to the base of the microprisms of 0.0002–0.001 inch and the microprisms have a height of 0.001–0.010 inch. An adhesive coating on the second face and over at least some of the microprism has bonded thereto a flexible backing member. At least 40 percent of microprisms have a retroreflecting interface at their surface.

BRIEF DESCRIPTION OF THE DRAWINGS

FIG. 9 is a fragmentary plan view of a grid pattern of the protective coating on the microprism face as formed in FIG. 4;

FIG. 10 is a diagrammatic view of the finished sheet material showing the path of light rays impinging upon the front face; and FIG. 11 is a fragmentary cross sectional view of another embodiment of the retroreflective material of the present invention.

DETAILED DESCRIPTION OF PREFERRED EMBODIMENT OF THE INVENTION

Figure 1:
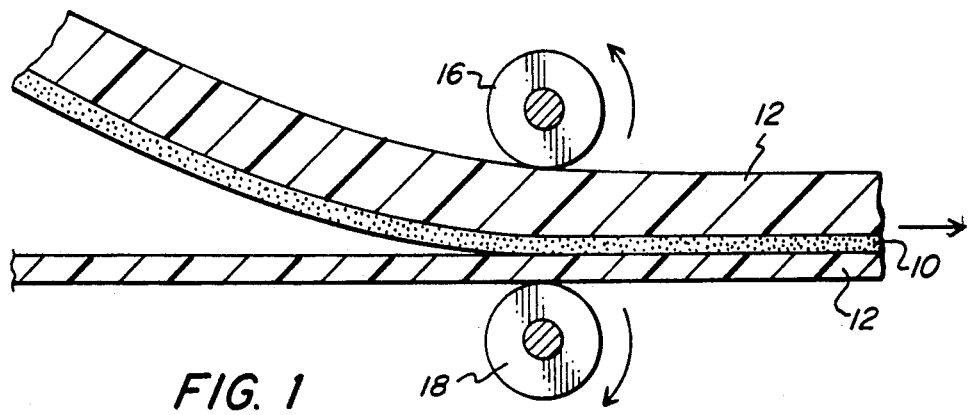
FIG. 1 is a partially diagrammatic illustration of an early step in one embodiment of a process for forming a retroreflective material embodying the present invention.

Turning first to FIG. 1, therein a thin flexible sheet material body member 10 is being temporarily laminated to a relatively thick carrier sheet 12 by an adhesive layer 14 which preferentially adheres to the carrier sheet 12. In this step, the thick carrier sheet 12 has been precoated with the adhesive 14 and is passed through the nip of a pair of laminating rollers 16, 18 with the body member 10.

Figure 2:
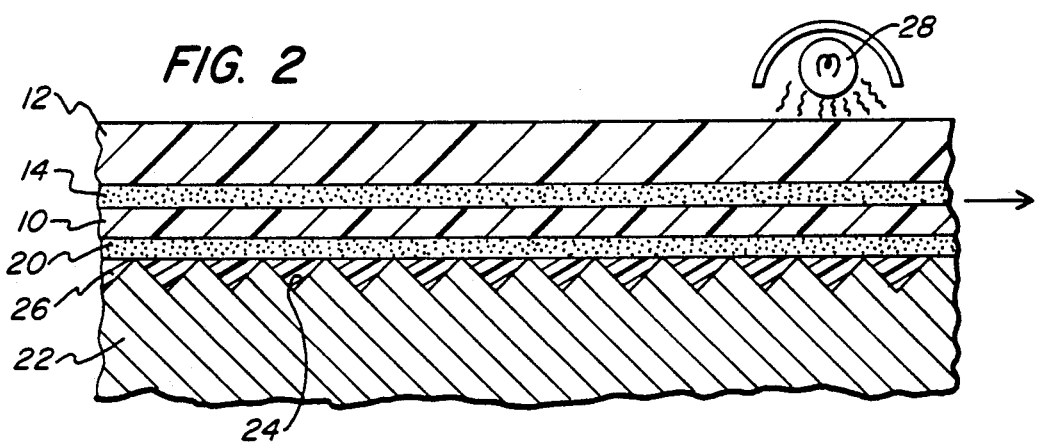
FIG. 2 is a similar illustration of a subsequent step in the process in which microprism formations have been formed thereon and are being cured in a mold by exposure to radiation.

In the next step (not shown), the lower or opposite surface of the body member 10 is provided with a thin tie coat 20 of synthetic resin. As seen in FIG. 2, this coated laminate is then pressed against the surface of a mold 22 with closely spaced microprism recesses 24 in which is deposited a fluid synthetic resin composition. The assembly is exposed to ultraviolet rays from the lamps 28 to cure the fluid resin composition to form microprism formations 26 on the surface of body member 10.

Figure 3:
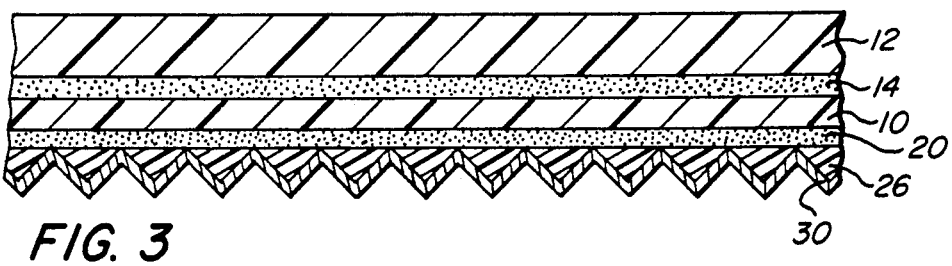
FIG. 3 is a similar illustration of a subsequent step in which a reflective metallic deposit has been formed on all the microprism formations.

In the illustrated embodiment of the process, the sheet material is stripped from the surface of the mold 22 and is then vacuum metallized or otherwise treated to form a reflective metallic deposit 30 on the surface of the microprism formations 26, as seen in FIG. 3.

Figure 4:
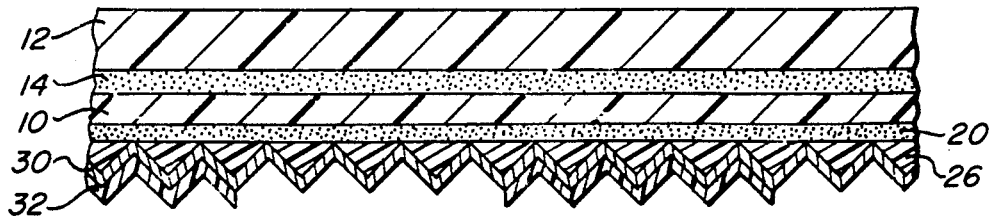
FIG. 4 is a similar illustration wherein a protective coating has been formed on the deposit in a pattern.

In the next step, and as seen in FIGS. 4 and 9, a coating 32 of a protective material is applied in a grid pattern over the metallic deposit 30 on the microprisms 26.

Figure 5:
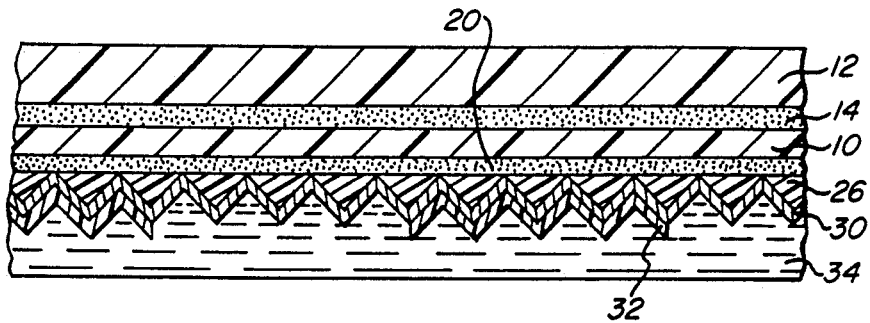
FIG. 5 is a similar illustration in which the material of FIG. 4 is shown in contact with a solvent for the unprotected metallic deposit.
Figure 6:
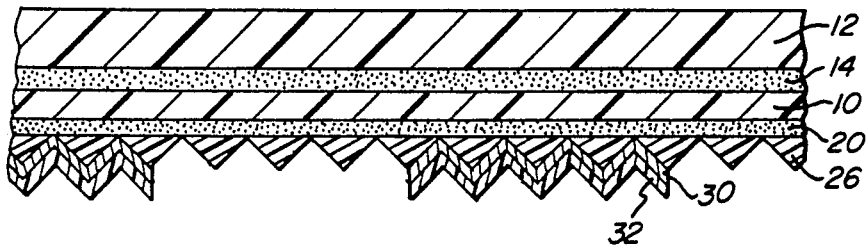
FIG. 6 is a similar illustration showing the material with the metallic deposit removed in the areas not protected by the coating.

In FIG. 5, the coated surface is shown as being exposed to a solvent 34 for the metallic deposit 30 which removes the deposit in the unprotected areas. This leaves the reflective metallic deposit 30 only in those areas underlying the protective coating 32 as seen in FIG. 6.

Figure 7:
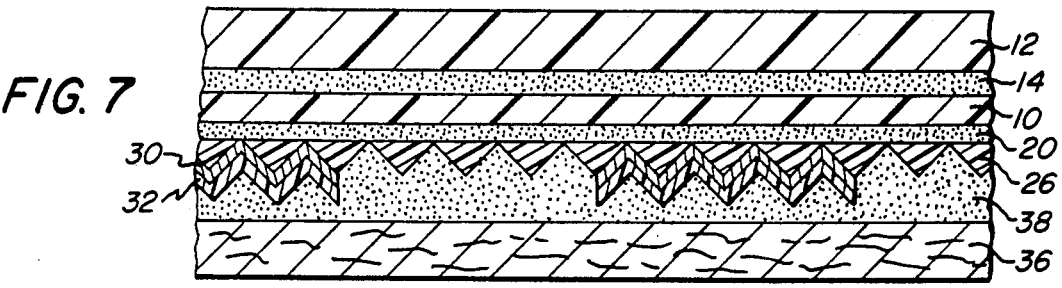
FIG. 7 is a similar illustration showing a colored adhesive coating material deposited over the entire surface of the sheet material and a fabric layer adhered thereto.

In FIG. 7, the laminate is shown as bonded to a flexible fabric 36 by a coating 38 of colored adhesive disposed over the entire surface of the microprism face. Thus, this coating 38 is in direct contact with those microprisms 26 which do not have the metallic deposit 30 and protective coating 32.

Figure 8:
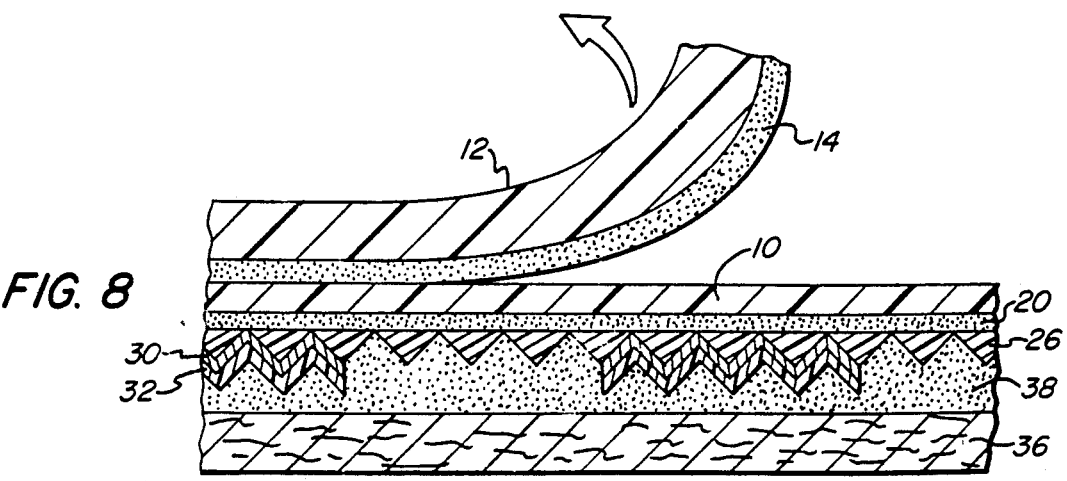
FIG. 8 is a similar illustration showing the removal of the carrier sheeting.

In FIG. 8, the carrier 12 and its adhesive bonding layer 14 are shown as being stripped from the fabric supported microprism material.

As seen in FIG. 10, those light rays 40a impinging upon the front face 42 of the retroreflective material which pass through the body member 10 and tie coat 20 into the microprisms 24 with the metallic deposit 30 impinge upon the retroreflective interface and are redirected from the surfaces of the microprisms 26 in a substantially parallel path. Those light rays 40b impinging upon the front face 42 which enter the microprisms 26 having their surfaces in direct contact with the colored adhesive 38 are refracted at that interface and are scattered at different angles thereby and provide a visual coloration to the retroreflective material in ambient light or daylight which is that of the colored adhesive 38.

In FIG. 11, another embodiment of the present invention is illustrated and in which an air interface is employed for the retroreflection. The colored adhesive 38 is applied in a grid pattern to a height above the prisms 26 and the fabric 36 is thereby spaced above the tips of the prisms to provide a retroreflective air interface about the prisms 26.

As previously indicated, the microprisms are closely spaced and can be described as cube corner formations. Details concerning the structure and operation of such microprisms may be found in Rowland U.S. Pat. No. 3,684,348 granted Aug. 15, 1972. These microprisms or cube corner formations may have a side edge dimension of up to 0.025 inch, but the preferred structures use edge dimensions of not more than 0.010 inch, and most desirably on the order of 0.004–0.008 inch.

The body member of the sheeting will generally have a thickness on the order of 0.0001–0.0007 inch and preferably about 0.0002–0.0004 inch when a highly flexible laminate is to be formed and, depending upon the method of fabrication, the resins, and other characteristics desired for the retroreflective sheeting.

The microprism sheeting may be formed by casting prisms upon a film surface functioning as the body, or by embossing a preformed sheeting, or by casting both body and prisms concurrently. Generally, the resins employed for the microprism sheeting are cross linked thermoplastic formulations, and desirably these resins provide flexibility, light stability, and good weathering characteristics. In some instances, the front face of the retroreflective sheeting may be provided with a protective coating such as by application of a lacquer or other coating material. Suitable resins for the retroreflective sheeting include vinyl chloride polymers, polyesters, polycarbonates, methyl methacrylate polymers, polyurethanes and acrylated urethanes.

To protect the relatively thin body member during processing, the relatively thick carrier temporarily bonded thereto will generally have a thickness of 0.005–0.008 inch. The adhesive used to effect the bonding therebetween preferentially adheres to the carrier and is conveniently a silicone adhesive applied to a thickness of about 0.00025–0.0005 inch. When ultraviolet curing of the resin in the prisms is employed, the adhesive must be transparent to the light rays. Although various resins may be employed for the carrier, polyesters, and particularly polyethylene terepthalate, are desirably employed because of their toughness and relative resistance to processing conditions. As with the adhesive, the carrier should be transparent to the ultraviolet radiation used to effect curing. Moreover, the surface of the carrier may be treated to enhance the preferential adhesion of the adhesive to the surface of the carrier.

A particularly advantageous method for making such retroreflective sheeting is described and claimed in Rowland U.S. Pat. No. 3,689,346 granted Sep. 5, 1972 in which the cube corner formations are cast in a cooperatively configured mold and are bonded to sheeting which is applied thereover to provide a composite structure in which the cube corner formations project from the one surface of the sheeting.

Another method for fabricating such microprism sheeting is shown in Rowland U.S. Pat. No. 4,244,683 granted Jan. 13, 1981 in which the cube corner formations are produced by embossing a length of sheeting in suitable embossing apparatus with precisely formed molds in a manner which avoids entrapment of air.

The latter method has been used for forming sheeting of acrylic and polycarbonate resins while the former method has proven highly advantageous for forming retroreflective sheeting from polyvinyl chloride resins and, more recently, polyester body members with prisms of various resin formulations including acrylated epoxy oligomers. Although the carrier concept of the present invention is useful in both types of operation, it is particularly beneficial in producing sheeting using thin polyester and like films which, while strong, might be damaged during the processing steps prior to its being supported by the flexible backing.

It is customary to provide a backing sheet behind the microprisms so as to protect them and to provide a smooth surface for application of the structure to support surfaces. To effect lamination of such a backing sheet to the retroreflective sheeting, adhesives and ultrasonic welding have generally been employed.

As is known, the reflective interface for the prisms may be provided by a reflective coating or by an air interface. In the preferred embodiment of the present invention, a reflective coating is provided upon the surfaces of at least some of the microprisms, and such reflective coatings have most commonly been vacuum metallized aluminum deposits, although metallic lacquers and other specular coating materials have also been used.

In one embodiment, the vacuum metallized prism surface is printed in a coating apparatus with a grid-like pattern of a protective coating material as indicated by the numeral 32 in FIGS. 4 and 9. In this grid pattern, there is a composite of underlying metal deposit 30 and overlying coating material 32. The coating material may be an adhesive, or a lacquer, or any other readily applied coating material which is essentially inert to the intended solvent bath.

The coated surface is subjected to treatment in a bath 34 of a solvent for the deposited metal, as shown by the numeral 16 in FIG. 5. This bath is conveniently a mild caustic solution which will dissolve an aluminum deposit. The portion of the metal coating 30 which is not protected by the second coating material 32 is removed by the solvent in this step so as to leave the prisms 30 within the areas bounded by the grid free from any coating.

In the preferred process in which the metal deposit is to be removed in those areas where it is not protected, the solvent conveniently comprises a solution of alkali metal hydroxide or other alkaline solution which will dissolve the aluminum. In the instance of coatings other than metals, solutions with which the material will react or in which it will dissolve, are employed.

The colored coating material may be a colored lacquer applied to the surface of the sheeting, a colored adhesive, or any other colored deposit which will coat the prism surfaces. Conveniently, a colored adhesive is employed since this will enable bonding of the backing material thereto.

A retroreflective material utilizing some prisms which have air interfaces and others which utilize reflective coatings offer some advantages and is described in detail in Martin U.S. Pat. No. 4,801,193 granted Jan. 31, 1989.

If so desired, retroreflective sheeting could be produced by applying the backing material to the partially metallized material so as to maintain the air interface in the uncoated areas.

To produce a sheeting which exhibits a coloration, a colored coating is then applied over the entire prism surface and directly coats the unmetallized prisms. Thereafter, the backing material is applied.

In the alternate embodiment using an air interface, a colored adhesive is applied in a pattern to the prism surface and to a depth greater than the height of the prisms. When the backing element is laminated thereto, it is spaced from the prisms by the adhesive and this provides an air interface about the uncoated prisms.

The backing sheet may be a woven or laid fabric, or a flexible, durable polymeric material. Suitable resins include polyethylene, polypropylene, polyurethanes, acrylated polyurethanes and ethylene/vinyl acetate copolymers. Polyester and urethane fabrics may be employed as well as those of natural fibers such as cotton. Flame retardants may be incorporated in the adhesives as well as in the fabric or resin backing to impart flame retardance to the retroreflective material.

Although other metals may be used to provide a specular metal deposit including silver, rhodium, copper, tin, zinc, and palladium, the preferred and most economical processes utilize aluminum vacuum deposition. Other deposition techniques include electroless plating, electroplating, ion deposition and sputter coating.

The protective coating material is desirably a pressure sensitive adhesive which will not be unduly affected in the solvent treating step, and it may be the same adhesive as employed as the means for bonding the backing member. Preferred adhesives include rubber based systems such as isobutylene in a solvent carrier and acrylic-based adhesives and silicones in solvent systems. Other adhesives may also be employed, and water based systems may also be used although sometimes requiring drying time before further processing. Specific examples of suitable adhesive systems are a rubber based, resin modified adhesive sold by B.F. Goodrich under the designation A1569-B, a latex rubber-based adhesive sold by Emhart Industries, Bostik Division, under the designation 8786X and a latex rubber-based system sold by B. F. Goodrich under the designation 26171, and a pressure sensitive silicone resin adhesive in a solvent sold by Dow under the designation QZ-7406.

Whether using solvent-based or water based systems, the coating may require drying before further processing. If so, heating may be utilized to accelerate the process.

The step of adhering the backing to the retroreflective sheeting may simply involve passing the adhesively coated retroreflective sheeting through the nip of a pair of rolls together with the backing material to apply the necessary pressure to effect adhesion. If a heat activatable adhesive is employed, the retroreflective sheeting may be subjected to preheating prior to passage through the rolls, or the rolls may be heated to achieve the necessary activation. However, it is also practicable to employ ultrasonic welding and other techniques to bond the backing material to the retroreflective sheeting by the material of the backing material itself when it is thermoplastic.

To provide a coloration to the retroreflective light at night, a dye may be incorporated in the resin used to form the body member, or the tie coat, or even the prisms. As an alternative to a dye and as an effective necessity in some resin systems, the coloration may be provided as a finely divided pigment which is well dispersed; however, some loss in retroreflectivety will occur as the result of refraction by pigment particles which are directly in the path of light rays.

Illustrative of the present invention is the following example.

EXAMPLE ONE

Utilizing the method generally illustrated in Rowland U.S. Pat. No. 3,689,346, microprisms having a height of 0.0028 inch and a spacing of about 0.006 inch on center are cast upon a polyester film having a thickness of 0.0005 inch, and coated with a tie coat of a solution of polyester resin. The thin polyester film is temporarily bonded to a carrier of surface treated polyester film having a thickness of 0.002 inch by a silicone adhesive. The resin employed for casting the prisms is an acrylated epoxy oligomer modified with monofunctional and trifunctional acrylic monomers and containing a cross linking catalyst.

The retroreflective sheeting is vacuum metallized with aluminum to a thickness in excess of 240 Angstroms. The metallized sheeting is then imprinted by a modified gravure roll with a grid pattern of a pressure sensitive, ever-tacky isobutylene rubber based adhesive. The grid has a spacing of ¼ inch between lines and the lines have a thickness of approximately 0.04 inch.

Following printing of the grid pattern, the sheeting is passed through a 1.0M. solution of sodium hydroxide for a period of 10-30 seconds during which the unprotected aluminum deposit is removed. The sheeting is then passed through a water bath to rinse the surface, and thence through a dryer. The sheeting is coated with a red pigmented silicone adhesive containing a bromine flame retardant to a thickness of about 0.004 inch or about 0.0015 inch above the tops of the prisms.

The coated sheet material is then passed through the nip of laminating rollers together with a woven cotten fabric treated with a flame retardant and having a thickness of about 0.006 inch to effect the lamination thereto. Thereafter, the carrier and its adhesive are stripped from the retroreflective sheeting.

Upon visual inspection, the retroreflective material is flexible and may be conformed easily to clothing and the like. It may be readily sewn to fabric and adhesively bonded to various substrates. The sheet material exhibits a red coloration in daylight. When exposed to a beam of directional incandescent light, it retroreflects brightly in a white/grey coloration.

Thus, it can be seen from the foregoing detailed specification and the attached drawings that the method of the present invention produces a retroreflective material which is highly flexible and which may be readily secured to clothing and the like. It has a high retroreflectivity when exposed to directional light sources at night. The material may be readily fabricated, is relatively durable, and may be made substantially resistant to the elements to which it may be exposed.

Having thus described the invention, what is claimed is:

1. In a method for making a flexible retroreflective sheet material, the steps comprising:
    (a) adhering a first face of a first relatively flexible synthetic resin sheet material to a synthetic resin second sheet material by a first adhesive which preferentially adheres to said second sheet material, said first sheet material having a thickness of 0.0001–0.0007 inch and said second sheet material having a thickness of 0.002–0.015 inch;
    (b) molding on the second face of said first sheet material closely spaced retroreflective microprisms having a height of 0.001–0.010 inch;
    (c) applying to said second face of said first sheet material upon which such microprisms have been molded, a second adhesive which is firmly engaged therewith;
    (d) adhering to said second adhesive over said second face a flexible backing material; and
    (e) stripping said second sheet material and said first adhesive from said first sheet material to produce a firmly bonded flexible composite sheet material comprised of the adhesively bonded first sheet material and backing material.

2. The method of making flexible retroreflective sheet material in accordance with claim 1 wherein there is included the step of producing a metallic deposit on the surfaces of said microprisms before application of said second adhesive thereto.

3. The method of making flexible retroreflective sheet material in accordance with claim 2 wherein there is included the step of removing a portion of the metallic deposit to provide a pattern of microprisms which are free from said metallic deposit and wherein said second adhesive is disposed over the microprisms which have said metallic deposit, said second adhesive spacing said backing member from said microprisms free from said metallic deposit to provide an air interface thereabout.

4. The method of making flexible retroreflective sheet material in accordance with claim 3 wherein said second adhesive is applied to said metallic deposit in a pattern and the metallic deposit not protected thereby is stripped.

5. The method of making flexible retroreflective sheet material in accordance with claim 3 wherein said second adhesive is applied in a grid pattern.

6. The method of making flexible retroreflective sheet material in accordance with claim 2 wherein there is included the steps of removing a portion of the metallic deposit to provide a pattern of microprisms which are free from said metallic deposit and thereafter applying to the entire second face a coating of a non-reflective colored second adhesive.

7. The method of making flexible retroreflective sheet material in accordance with claim 6 wherein the step of removing said metallic deposit comprises first applying a protective material to said metallic deposit in a pattern and then removing the metallic deposit in the areas unprotected by said protective material.

8. The method of making flexible retroreflective sheet material in accordance with claim 1 wherein said backing material is a fabric.

9. The method of making flexible retroreflective sheet material in accordance with claim 1 wherein said backing material is a flexible synthetic resin sheet material.

10. The method of making flexible retroreflective sheet material in accordance with claim 1 wherein said step of forming said microprisms includes initially providing a tie coat of synthetic resin on said second face and thereafter forming said microprisms on said tie coat.

* * * * *